H. A. BABCOCK.
MOTOR VEHICLE SPRING SUSPENSION.
APPLICATION FILED JAN. 18, 1917.

1,381,157.

Patented June 14, 1921.

Witnesses:
C. H. Roessner
Frances L. Pound

Inventor.
Henry A. Babcock.
By George Depew Jones
Atty.

UNITED STATES PATENT OFFICE.

HENRY A. BABCOCK, OF EVANSTON, ILLINOIS, ASSIGNOR, BY DIRECT AND MESNE ASSIGNMENTS, TO THE BABCOCK-GALLAGHER COMPANY, OF COLUMBUS, OHIO, A CORPORATION OF OHIO.

MOTOR-VEHICLE SPRING SUSPENSION.

1,381,157.  Specification of Letters Patent.  Patented June 14, 1921.

Application filed January 18, 1917. Serial No. 143,160.

*To all whom it may concern:*

Be it known that I, HENRY A. BABCOCK, a citizen of the United States, residing at Evanston, in the county of Cook and State of Illinois, have invented a certain new and useful Improvement in Motor-Vehicle Spring Suspensions, of which the following is a full, clear, concise, and exact description.

This invention relates to improvements in vehicle spring suspension and more particularly to a spring suspension of this character adapted for use in connection with motor vehicles.

Heretofore motor vehicle spring suspensions have been constructed to take up the vertical thrusts caused by the wheels of the vehicle coming into contact with irregularities in the road, but no effective provision has been made in such constructions to compensate for the horizontal thrusts also encountered. The result is that violent shocks of the horizontal thrust type are transmitted almost directly to the vehicle frame in the form of sudden impacts which the springs are unable to effectively cushion thereby causing considerable discomfort to the occupants of the vehicle and in time a general loosening of the various parts of the mechanism. It is well known that when one of the wheels of a vehicle strikes an obstruction in the road a thrust is exerted tending not only to move the axle upward in a vertical plane but also tending to move it rearward in a substantially horizontal plane. Furthermore, in spring suspensions as now commonly used no provision is made whereby the deflection of one wheel of the vehicle is transmitted to the wheel on the opposite side thereof to thus retain the axle at right angles to the frame of said vehicle at all times. As a result when one wheel encounters an irregularity in the road the axle is skewed somewhat at an angle to the transverse axis of the vehicle thereby causing it to swerve out of its intended path of travel. Other disadvantages also attend this form of spring suspension.

It is therefore, the primary object of the present invention to produce a spring suspension of the type described, which will effectively compensate, not only for the vertical thrusts imposed upon the axle of a vehicle as a result of the wheels thereof coming in contact with irregularities in the road, but to also compensate for the horizontal thrusts.

Another object of the invention is to provide a motor vehicle spring suspension which will effectively transmit the horizontal thrusts encountered by the wheels of the vehicle on one side thereof to the wheels on the other side thereof, thereby affording means whereby the axles of the vehicle are held substantially parallel to each other and to the transverse axis of said vehicle at all times.

A further object of the invention is the provision of a novel form of steering mechanism whereby the front or steering wheels may move back and forth in a substantially horizontal plane without any disarrangement of said steering mechanism and without any change in the angle at which the wheels have been set.

A still further object of the invention is the provision of means adapted to coöperate with a spring suspension of the type described whereby relative movements between the rear axle and certain parts of the vehicle which would otherwise be affected thereby, are compensated for.

Further objects and advantages of the invention will be apparent from the following detailed description of the preferred embodiment of the invention shown in the accompanying drawings. It is to be understood however that the disclosure is for the purpose of illustration only, and not as defining the limits of the invention.

The frame of the automobile is indicated at 1 and may be of any preferred type of construction, it being shown in the drawings as comprising the usual side and end members of channel and angle iron construction. The means whereby the frame is supported on the front and rear axles 2 and 3 respectively, constitutes one of the features of the invention and will now be described. The frame 1 is supported on the front axle 2 by means of a pair of longitudinally disposed springs 4 preferably made up of a plurality of substantially flat leaves 5. It is a well known fact that a substantially flat leaf spring of this type absorbs the vertically directed shocks incident to travel far more effectively than do the elliptic or fractional elliptic springs which are ordinarily used in motor vehicle construction. These springs 4 are secured to the axle 2 in any suitable manner and are connected at each end to the side members of the frame 1 by links 6—6', said springs and links and the overlying portions of the side members of the frame constituting in effect a parallelogram, whereby said links may be swung back and forth. The transverse member 7 which is preferably in the form of an angle iron, is connected to the front ends of the two springs 4 and is also pivoted to the side members of the frame 1 as shown at 8, whereby forward or backward movement of one end of the front axle 2 caused by horizontal thrusts encountered by the wheels of the vehicle during its travel will be transmitted to the other end of said axle. Without this provision, if one of the wheels should strike an obstacle in the road, it would be deflected not only upwardly but rearwardly, while the opposite side would not be thus deflected. As a result the front axle would not remain at right angles to the frame and the car would swerve to one side. The angle iron 7 is formed with sufficient rigidity to transmit the rearward movement from one side of the axle to the other.

Figure 11:
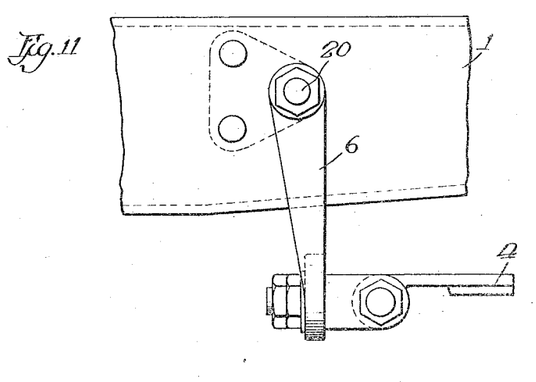
Figure 12:
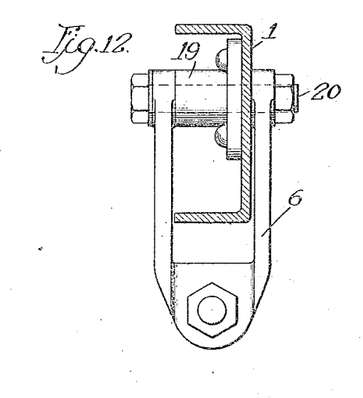

To maintain the links 6—6' in the desired position, which is nearly vertical, said links being inclined slightly downwardly and forwardly, drag links 9 in the form of ball and socket connections are provided which join the forward end of each of the springs 4 to a transverse spring 10, the leaves of which are also preferably flat but being arranged in vertical planes or in other words at right angles to the leaves of the springs 4. It will be noted in the drawings, particularly Figs. 2 and 11, that the imaginary line connecting the upper pivotal support of the link 6 with the lower swivel connection of the spring 4 therewith is inclined downwardly and forwardly. This construction is to permit of the longitudinal springs 4 swinging back and forth an appreciable distance before the links 6 or either of them, pass the dead center position. This has been found very desirable in practice. It will thus be seen that any rearward thrust of the usual type imposed upon the front axle of the car when the same is in motion will cause the lower ends of said links 6 to move in a substantially horizontal plane, which would not be the case if the links were normally positioned vertically.

The transverse spring 10 may be supported at the forward ends of the springs 4 in any suitable manner, it being shown in the drawings however as clamped to a suitable supporting bracket 11 carried by the forward transverse member of the frame 1. As a result the ends of said spring are deflected rearwardly whenever either of the front wheels strikes an obstruction, the deflection on both sides thereof being substantially equal, owing to the arrangement of the transverse member 7 and to its pivotal engagements with the frame 1 and with the springs 4.

From this arrangement it will be seen that the springs 4 will compensate for any upward movement of the axle and that the spring 10 compensates for any back and forth movement thereof. These two movements represent the components of force which are directed from the rim to the axis of rotation of the wheel when the latter strikes an obstruction, and since both components are cushioned by means of the springs arranged transversely and longitudinally a much easier riding chassis is obtained.

Figures 3, 13:
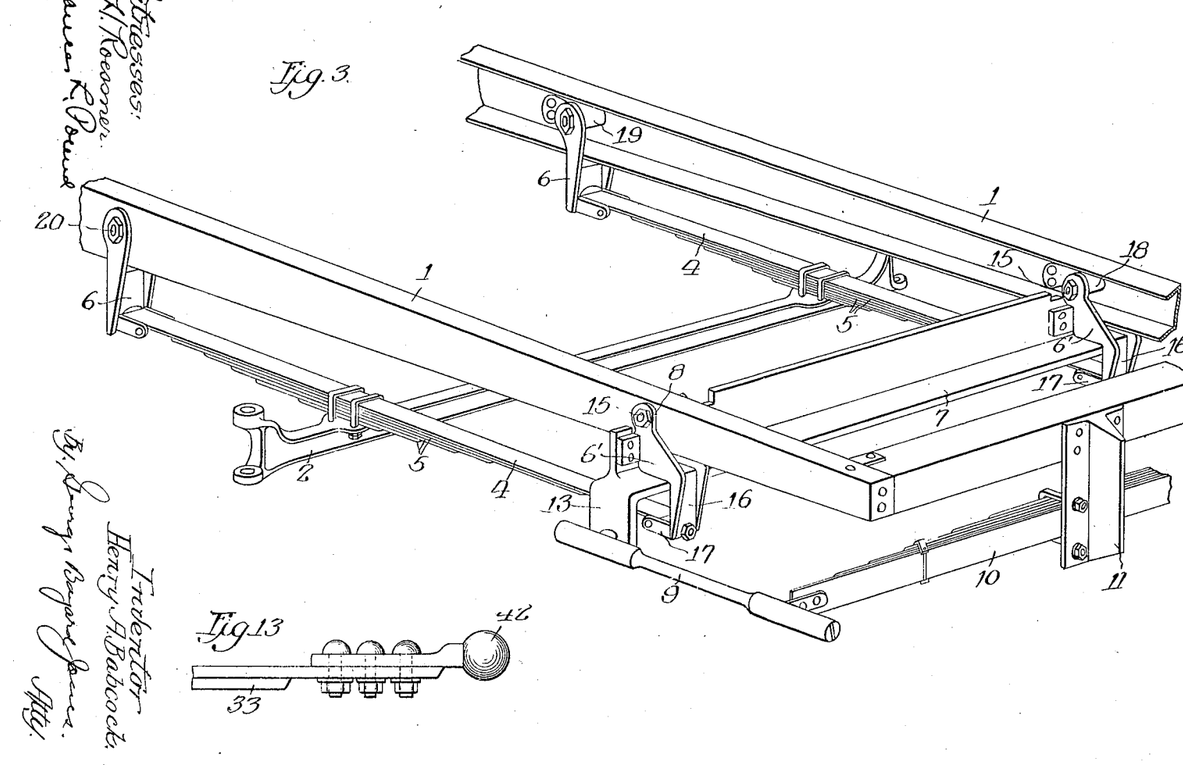
Fig. 3 is a perspective view of the front construction, parts being broken away.
Figs. 5, 6, 7, 8, 9, 10, 11, 12 and 13 are detailed views.
Figure 5:
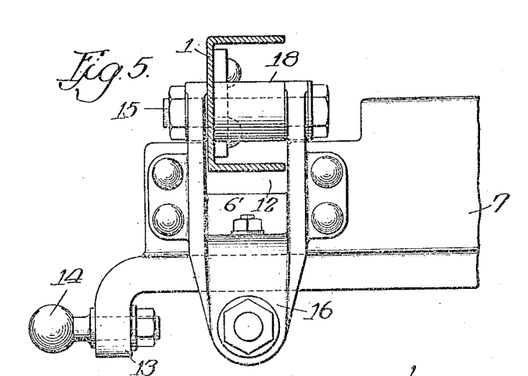
Figure 6:
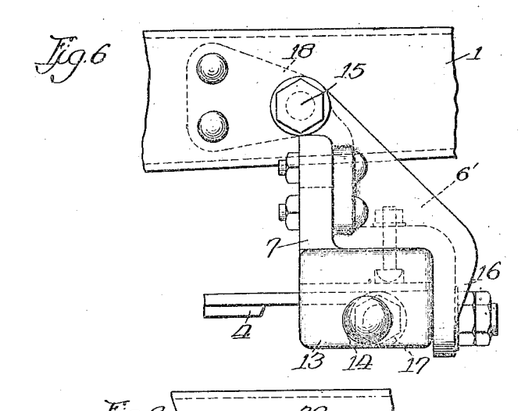

The particular arrangement and construction of the transverse bar 7 which connects the forward ends of the springs 4, is shown particularly in Figs. 3, 5 and 6. As shown the bar is provided with cutout portions 12 adapted to receive the side members of the frame 1, said bar extending beyond the side members of the frame on each side thereof and having its ends bent downwardly as illustrated at 13, said ends 13 being provided with suitable connecting means 14 for engagement with the drag links 9 which connect said transverse member 7 with the ends of the transverse spring 10 to transmit the back and forth motion of the springs 4 thereto. Bolted to the transverse bar 7 adjacent to the cutout portions 12 thereof are the links 6' shown as bifurcated at their upper ends, said bifurcations corresponding substantially to the cutout portions 12 of the transverse bar 7. These links are preferably in the form of angular brackets, and are pivoted to the side members of the frame 1 at 8 by any suitable means such as a transverse bolt 15. These links or angle brackets 6' are preferably shown bent downwardly over the forward end of the transverse bar 7, as indicated at 16, and are provided with suitable swivel connections 17 adapted to receive the forward ends of the springs 4. Suitable bearings 18 are shown rigidly secured to the inner surfaces of the side members of the frame 1 and are adapted to provide additional bearing surfaces for the transverse bolts 15, on the ends of which are pivotally mounted the links 6' which support the transverse bar 7. It is clearly obvious that these bearings 18 could be, if desired, formed integral with the frame. The links 6 pivotally connecting the rear ends of the springs 4 with the frame 1 are also shown provided with suitable bifurcations at their upper ends adapted to embrace the side members of said frame in a manner much the same as that described in connection with the forward links 6'. The links 6 are pivotally supported to the frame by means of the transverse bolts 20. Suitable bearings 19, substantially similar to the bearings 18, are also provided to coöperate with the pivot 20 in forming a support sufficiently strong to withstand the various stresses exerted thereon. As previously described, the lower ends of the links 6 are connected to the rear ends of the longitudinal springs 4; the links 6—6', the portions of the frame lying intermediate said links, and said longitudinal springs constituting the parallelograms heretofore mentioned.

As above set forth the drag links 9 connecting the ends of the transverse spring 10 with the forward ends of springs 4 are preferably in the form of ball and socket joints, in order to provide for a substantially universal movement between the ends of said springs.

The car is steered by a suitable steering wheel (not shown), which is mounted on the steering post 21, the latter having associated therewith the usual worm and sector unit (not shown) by means of which the rotary movement applied to the steering wheel is communicated to the link 22, said link being pivotally connected to a suitable bell crank lever 23, the latter being in turn connected to a transverse link 24, which is attached at one end to the usual steering knuckles, whereby the front wheels may be turned at various angles. The movement from one steering knuckle to the other is imparted through an arm 25, cross bar 26 and arm 27 in the usual manner. By virtue of the provision of the links 22 and 24, and the intermediate bell crank lever 23, the front axle is free to move back and forth in a substantially horizontal plane as well as in a vertical plane without in any way interfering with the steering of the machine.

Figure 4:
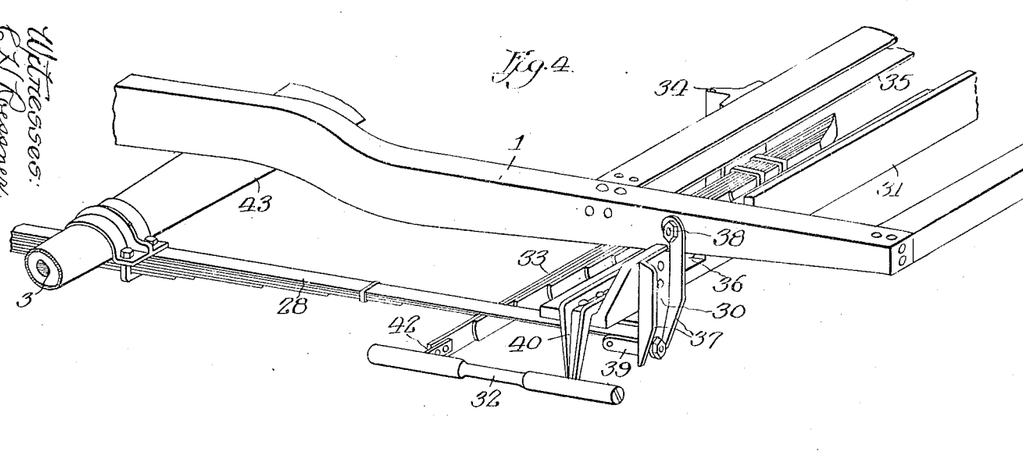
Fig. 4 is a similar view of the rear construction.
Figure 7:
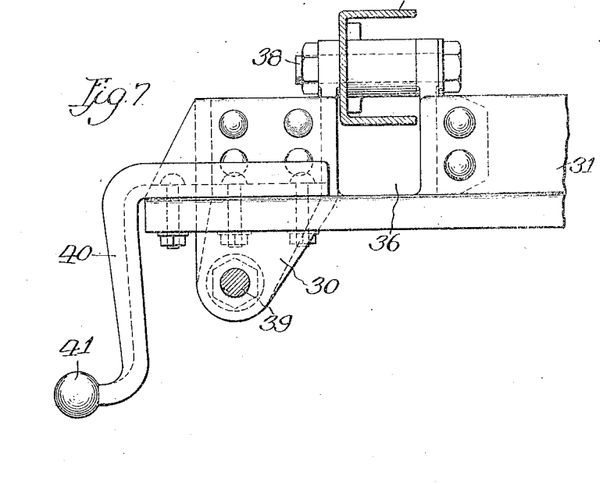
Figure 8:
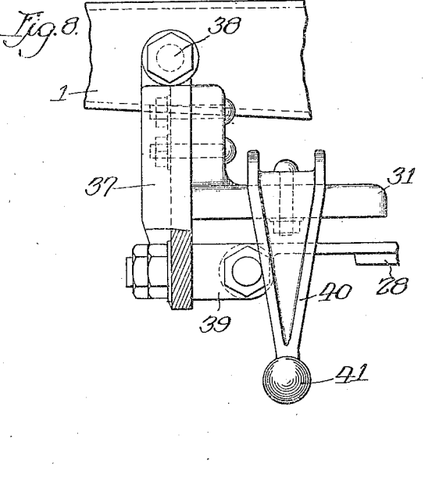

The rear of the chassis is also provided with means whereby the movement of the axle in a vertical plane and in a horizontal plane is compensated for, said means being substantially similar to that shown and described in connection with the front of the chassis. Longitudinal springs 28 also of substantially flat leaf construction, are carried by the rear axle 3 and are connected at opposite ends by links 29 and 30 to the frame 1, in a manner substantially similar to the corresponding construction of the front spring suspension. A transverse bar 31, preferably in the form of an angle iron, is provided at the rear ends of said springs whereby the rear axle is also maintained at right angles to the transverse axis of the frame. Movement of the springs 28 in a horizontal plane is communicated from the rear ends thereof through a pair of drag links 32 to the transverse spring 33, the latter being secured by bracket 34 to the transverse member 35 of the frame 1. It will be noted from the foregoing that this construction is substantially similar to the construction at the front end of the chassis, the transverse spring 33, however, being preferably positioned intermediate the rear axle 3 and the ends of the longitudinal springs 28 in order that a more compact arrangement may be obtained. This slight change in the arrangement of the springs does not modify the action of the springs, said action being substantially the same as the action of the front springs. The construction of the transverse bar 31 and its pivotal connections to the side members of the frame 1 is slightly different from that of the transverse bar 7 of the front construction, as will be noted by reference to Figs. 4, 7 and 8 of the drawings. As shown, the transverse bar 31 is provided with the cutaway portions 36 for the reception of the side members of the frame, said bar being preferably in the form of an angle iron, as above set forth. On the upright flange of the transverse bar 31 are bolted or otherwise secured, the links 30 shown provided with suitable reinforcing flanges 37, the upper end of said links being pivotally mounted on the side members of the frame 1 by means of suitable bolts 38 passing therethrough. The lower ends of the links 30 are provided with suitable swivel connections 39 adapted to receive the rear ends of the longitudinal springs 28. Bolted to the horizontal flange of the transverse bar 31 are suitable brackets 40 shown as overhanging said flange and provided at their lower ends with suitable connecting means preferably in the form of balls 41 adapted for engagement with the inner ends of the drag links 32. The ends of the transverse spring 33 are also provided with suitable ball connections 42 adapted for engagement with the other ends of said drag links 32 in order that the horizontal movement of the longitudinal springs 28 may be transmitted to said transverse spring 33 regardless of the relative positions of said springs.

The back and forth motion of the rear axle 3 and hence of the differential gear inclosed within the axle housing 43, makes it necessary to provide for the relative movements between the forward end of the drive shaft 44 and the adjacent end of the shaft which projects rearwardly from the engine and which is connected therewith by means of the usual universal joint. Such movement is compensated for by the oppositely extending lugs 45 of the universal joint, which slide in suitable guides in the housing 46 thereof, a spring 47 being provided to cushion the thrusts imposed upon said drive shaft. This construction is largely old and hence is not illustrated in detail. It will be readily seen that should the guides in the housing 46 as provided in connection with universal joints forming a part of the standard equipment of motor vehicles as now manufactured, be too short to compensate for such relative movement between the shafts that said housing could readily be lengthened, thereby increasing the length of the guides as much as desired.

Figure 1:
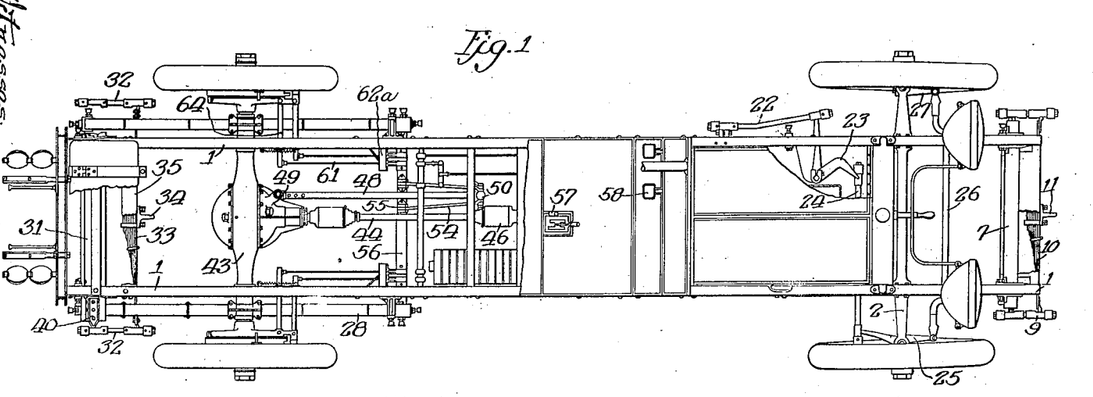
Figure 1 is a top plan view showing the invention applied to the chassis of an automobile.
Figure 2:
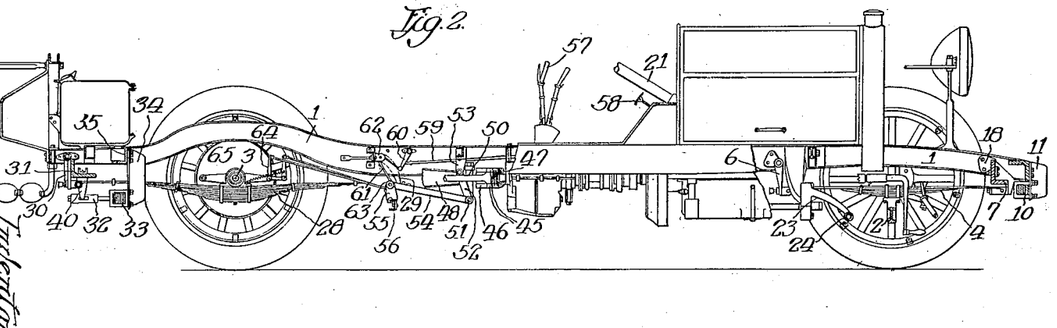
Fig. 2 is a side elevation thereof.
Figures 9, 10:
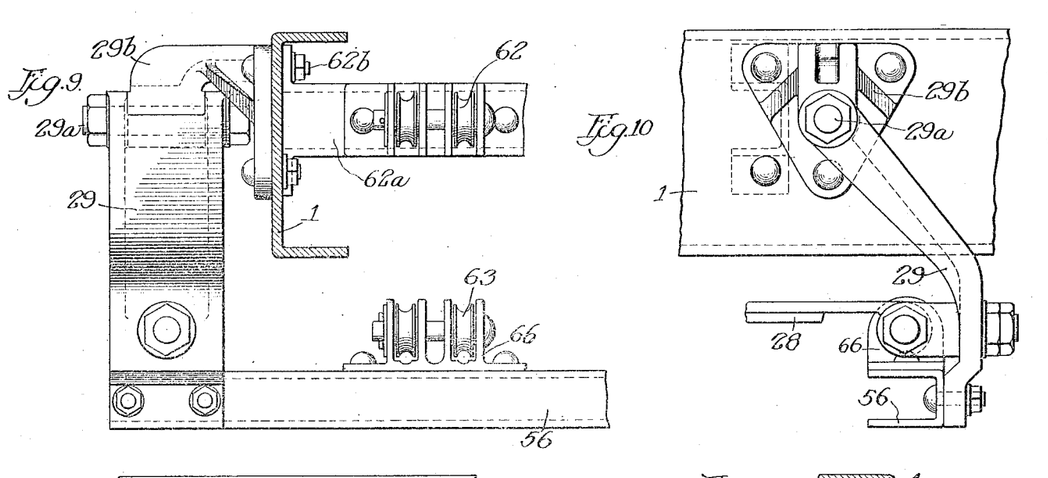

It is also necessary to provide for the back and forth motion of the torque rod 48. This rod, it will be noted by referring to Figs. 1 and 2 of the drawings, is connected at its rear end 49 to the differential housing 43 in the usual manner. At its forward end it is pivotally connected to a vertical ball and socket member 50 of the usual type, the latter being pivotally mounted on a horizontal rod 51 pivotally supported by links 52 from a bracket 53. A link 54 connects rod 51 and bracket 55 mounted on channel member 56. The channel member 56, it will be noted by referring to Figs. 2, 9 and 10, is connected at its ends to the links 29 preferably below the longitudinal springs 28 and their connections with the said links 29. Thus it will be noted that the channel member 56 lies transversely of the frame 1 and in a plane below that of the inner pivotal connections of the longitudinal springs 28 with the links 29. Accordingly, the transverse member 56 is adapted to swing back and forth through a limited angle with said links 29, said links being pivoted at $29^a$ to brackets $29^b$ fastened in any suitable manner to the frame 1, movement being imparted to the same by the springs 28 through the inner pivotal engagements of said springs 28 therewith. The link 54 is preferably substantially parallel to the imaginary line connecting the pivotal supports of the links 29 and 52 (see Fig. 2). It will be seen therefore that as the channel member 56 and the bracket 55 carried thereby oscillate about the pivotal support of the link 29, the link 52 will also oscillate in like manner about its pivotal support, owing to the connecting link 54. The back and forth movement of the ball and socket member 50 and hence the torque rod 48, is therefore the same as the back and forth movement of the rear axle and its housing and of the longitudinal springs 28. In other words, there is substantially no change in the distance between the differential housing 43 to which the torque rod 48 is connected at one end and the ball and socket member 50, to which said rod is connected at its other end. Longitudinal movement of the torque rod, therefore, is permitted without in any way rendering said rod ineffective in the performance of its functions in preventing rotation of the rear axle housing.

Provision has also been made to compensate for the relative movements which may occur between the various elements going to make up the brake control mechanism. The usual hand lever 57 and foot pedal 58 may be provided to control the brakes. The foot pedal 58 is connected to the brake rod 59, which is shown attached at its rear end to the pivot link 60. The latter is preferably provided with a cable or suitable flexible tension member 61 which is secured thereto and which extends therefrom over suitable pulleys 62—63, said flexible tension member 61 being connected at its other end to the operating brake link 64, whereby the brakes coöperating with the housing 65 may be operated in the usual manner. It is clearly obvious that various other forms of brake mechanism may be substituted for the particular form and arrangement shown in the drawings and I do not therefore desire to limit myself to such showing, it being clearly obvious that rods and bell crank levers or any other suitable mechanism could be used if desired instead of cables and pulleys such as shown.

The pulley 62 is preferably rotatably mounted on a suitable support $62^a$ bolted to the frame 1 at $62^b$ in such manner that the pivotal support of the pulley is in line with the pivotal support of the upper end of the link 29, (see Fig. 9). The pulley 63 is journaled in a suitable bracket 66 mounted upon the upper surface of the channel member 56 which, as heretofore described, is connected to the lower ends of the links 29 and accordingly moves through a limited angle therewith. It will thus be seen that movement of the pulley 63 through the arc described by the lower end of the link 29 when the same is oscillated by the horizontal movement of the longitudinal springs 28, will not result in increasing or decreasing the effective length of the cable 61. As a result, the brakes may be applied in the usual manner regardless of the motion of the rear axle and of the brake band housing in a horizontal plane or in the usual vertical plane. Two sets of pulleys are shown in the drawings, the second set being adapted to receive the cable which connects with and which is operated by the emergency brake lever 57. The connections and operation of this brake control being substantially the same as that just described and the relative movements between the parts thereof being compensated for in the same manner, as will be obvious from the drawings, the foregoing detailed description of the pedal brake mechanism, it is believed, will also suffice for the emergency brake mechanism.

Figures 14, 15:
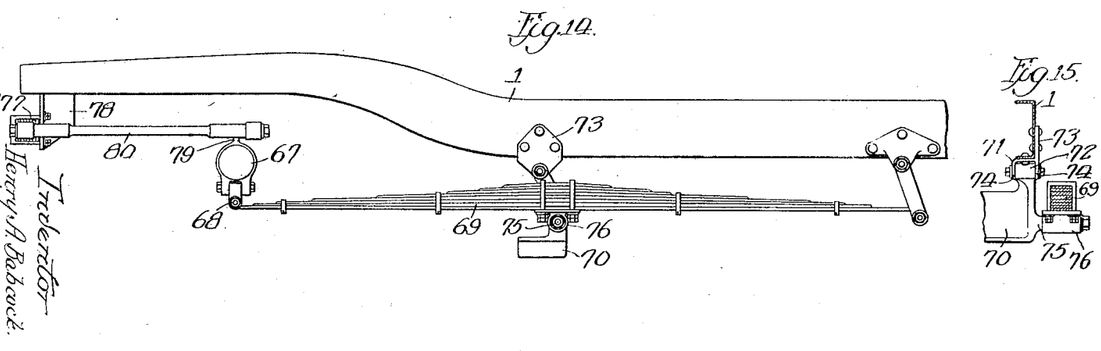
Fig. 14 is a side elevation showing the invention applied to a spring suspension of the cantaliver type.
Fig. 15 is a cross sectional view thereof.

In Figs. 14 and 15 the invention is shown as applied to a cantaliver spring suspension. In this embodiment the rear axle housing is illustrated at 67 and, as is usual in spring suspensions of the cantaliver type said axle housing is swiveled to one end 68 of the longitudinal spring 69, said spring 69 being pivotally supported from the side member of the frame 1 at its other end and at a point intermediate its ends, substantially as shown. By referring to Fig. 15 of the drawings it will be noted that the transverse bar shown at 70 is preferably pivotally connected to the frame at 71 by means of a suitable journal bearing 72, preferably integral with said transverse member 70, and a bracket 73 fastened to the side member of the frame in any suitable manner. This bracket 73 as shown is provided with depending lugs 74 adapted to underlie the frame and to receive the journal bearing 72 of the transverse bar 70. A bolt is passed through the bearing 72 and the lugs 74 to pivotally connect the bar 70 to the frame. The transverse bar 70 is also provided with suitable spindles 75 projecting from either side thereof for the pivotal reception of the journal bearing 76 clamped to the base of the longitudinal spring 69. The transverse spring 77 is shown supported from a suitable bracket 78 bolted to a cross member of the frame 1 and instead of being connected directly to the ends of the longitudinal springs 69, it is connected to the rear axle housing 67 as shown at 79. In this arrangement the horizontal thrusts imposed upon the axle will be transmitted directly to the transverse spring 77 by means of the drag links 80, the longitudinal springs 69 pivotally mounted, as above set forth, upon the projecting spindles 75 of the transverse bar 70, being free to oscillate, and owing to the swinging suspension of said transverse bar 70, said springs are also free to move back and forth in a substantially horizontal plane, the action being substantially similar to that described in connection with the preferred embodiment.

The drag links shown and described in connection with both forms of suspension are preferably of standard construction, no claim being made thereto. In view of this, said links have not been shown in detail as any form of link may be used, those illustrated in the drawings being provided with suitable sockets for the reception of the ball connecting members shown mounted on the ends of the several transverse bars and also on opposite ends of the transverse springs, to permit of a substantially universal movement therebetween as heretofore stated.

It is obvious that various changes in the construction of the various parts herein described may be made without departing from the spirit of the invention. For instance, it may be found more practical, in the construction of the transverse bars together with their supporting links, to form the same from a single piece of metal by a stamping or drop-forging operation and, therefore, I do not wish to be limited to the precise construction shown.

It is also obvious from the foregoing that the present invention is not only applicable to motor vehicles of either the pleasure or commercial type but may also be used on other vehicles, and that the invention as a whole is susceptible of many modifications and changes, and the right is therefore reserved to make such modifications and changes as fairly fall within the scope of the appended claims.

Having thus described my invention, what I claim as new and desire to secure by Letters Patent of the United States is:

1. An automobile chassis comprising a frame, an axle, a pair of longitudinally disposed springs interposed between said frame and said axle, pivoted links connecting opposite ends of each spring to said frame to permit of said springs and axle moving longitudinally thereof, and a transverse member connected to said springs and adapted to transmit the longitudinal movements of either of said springs to the other, whereby both springs may move in unison.

2. An automobile chassis comprising a frame, an axle, a pair of longitudinally disposed springs connected to said axle, pivoted links connecting opposite ends of each spring to said frame, a transverse member connected to said springs to insure the same movement thereof in a horizontal plane, and a transverse spring connected to each of said first springs to cushion the movement of the latter in a horizontal plane.

3. An automobile chassis comprising a frame, having a transverse member, a pair of links on each side of said frame, a pair of longitudinally disposed springs each connected at opposite ends to a pair of said links, a transverse spring connected at its middle portion to said transverse member leaving its ends free to be deflected, and links connecting said free ends to said first springs.

4. An automobile chassis comprising a frame, front and rear axles therefor, longitudinally disposed springs for said axles, links connecting said springs to said frame, a rigid transverse member connecting opposite springs of each pair, transverse springs adjacent the front and rear axles and connections between said transverse springs and said longitudinal springs for cushioning the horizontal movements of said axles.

5. An automobile chassis comprising rear wheels, a rear axle supported thereby, a pair of springs supported by said axle, links connecting opposite ends of said springs to said frame, a torque rod connected at one end to said rear axle, and means connected to the other end of said torque rod and to one end of said springs to compensate for relative movements between said rear axle and said frame.

6. In an automobile chassis, the combination with the frame and rear axle thereof, of a pair of springs carried thereby, links connecting the opposite ends of said springs to said frame, a transverse member associated with two of said links on opposite sides of said frame, a second link arranged parallel to said last mentioned links, an additional link connecting the free end of said second links with the free ends of said two opposite links and a torque rod connected at one end to the free end of said additional link and at the other end to said rear axle.

7. In an automobile chassis, the combination with a frame having a link thereon, of a longitudinally disposed spring connected to the free end of said link, a pulley mounted in line with the pivotal axis of said link, a second pulley mounted in line with the pivotal connection between said link and said spring, and a flexible cable passing over said pulleys, whereby movement of one pulley about the other as a center, does not result in changing the effective length of said cable.

8. In a spring suspension for motor vehicles, a pair of longitudinally disposed springs arranged between the axle and frame of the vehicle, and a transverse member connecting the ends of said springs and pivotally supported from said frame for bodily movement with respect thereto whereby any movement of either of said springs in a horizontal plane is transmitted to the other of said springs.

9. In a spring suspension for motor vehicles, a pair of longitudinally disposed springs arranged between the axle and frame of the vehicle, a transverse member connecting the ends of said springs and being pivotally supported from said frame whereby any movement of either of said springs in a horizontal plane is transmitted to the other of said springs, a transverse spring, and means interposed between said transverse spring and said transverse member adapted to transmit the horizontal movement of said longitudinal springs to said transverse spring.

10. In a spring suspension for motor vehicles, a pair of longitudinally disposed springs arranged between the axle and frame of the vehicle, a transverse member connecting the ends of said springs and being pivotally supported from said frame whereby any movement of either of said springs in a horizontal plane is transmitted to the other of said springs, a transverse spring disposed near the ends of said longitudinal springs, said transverse member having its ends bent downwardly, and links connecting the ends of said transverse spring with the downwardly bent ends of said transverse member whereby the movement of said longitudinal springs in a horizontal plane is transmitted to said transverse spring and cushioned thereby.

11. A rear spring suspension for motor vehicles comprising a pair of longitudinally disposed springs arranged between the rear axle and frame of the vehicle, a transverse spring coöperating therewith to cushion the horizontal movements of said first mentioned springs, a transverse bar mounted across opposite ends of said springs and pivoted to said frame, to transmit movement from one of said springs to the other and means coöperating with the other ends of said springs whereby relative movements between said axle and the brake mechanism of the vehicle are compensated for.

12. The combination with the chassis of a motor vehicle including the usual frame, rear axle, brake mechanism, torque rod and longitudinally disposed springs intermediate said axle and said frame, of links connecting the opposite ends of said springs to said frame, a transverse spring connecting the ends of said longitudinal springs to cushion the horizontal movements thereof and means coöperating with said longitudinal springs to compensate for the longitudinal movements of said torque rod and for the relative movements between said axle and said brake mechanism.

13. An automobile chassis, comprising a frame, an axle, a pair of longitudinally disposed springs connected to said axle and adapted to support said frame, means whereby said springs are permitted to move longitudinally with relation to said frame, means also movable longitudinally with relation to said frame adapted to transmit the longitudinal movements of either of said springs to the other whereby both springs may move in unison and a transverse spring for cushioning the longitudinal movements of both of said first-named springs.

14. In an automobile chassis, the combination with the frame, rear axle and the springs interposed between said frame and axle, of links connecting the opposite ends of said springs to said frame whereby said springs and said axle may move longitudinally with relation to said frame, a transverse member supported by two of said links at opposite sides of said frame, a link depending from said frame in advance of said transverse member and arranged substantially parallel to the links supporting the same, a connecting rod extending between said transverse member and the free end of said last named link, and a torque rod attached to the rear axle housing and to said link whereby said torque rod is permitted to move longitudinally with said axle and with said springs without being rendered ineffective in the performance of its functions.

15. An automobile chassis, comprising a frame, an axle, a pair of longitudinally disposed springs interposed between said frame and said axle, pivoted links connecting each spring to said frame whereby said springs may move longitudinally with relation to said frame, a transverse member connecting two of said links and adapted to transmit the longitudinal movements of either of said springs to the other, and means adapted to cushion such movements of said springs.

16. In an automobile chassis, the combination with a frame having a link pivoted at one end thereto, of a longitudinally disposed spring connected to the free end of said link, a set of pulleys mounted in line with the pivotal axis of said link, a second set of pulleys mounted in line with the pivotal connection between said link and said spring, and flexible cables passing over said pulleys whereby the effective length of said cables is maintained constant during said movements of the second set of pulleys relative to said first set.

17. The combination with the chassis of a motor vehicle including the usual frame, rear axle, brake mechanism, torque rod and longitudinallly disposed springs intermediate said axle and said frame, of pivoted links connecting said springs to said frame to permit of said springs moving longitudinally thereof, means connecting the ends of said springs for cushioning said longitudinal movements, and means associated with said springs for compensating for the resultant longitudinal movements of said torque rod and the relative movements between said axle and said brake mechanism.

18. An automobile chassis comprising a frame, a pair of longitudinally disposed springs, pivoted links connecting opposite ends of each spring to said frame, a transverse member connected to said springs to insure the same movement thereof in a horizontal plane, and a transverse spring connected to said first springs to cushion the movement of the latter in a horizontal plane.

19. An automobile chassis comprising a frame, a pair of longitudinally disposed springs, pivoted links connecting opposite ends of each spring to said frame whereby said springs may move longitudinally with relation to said frame, an axle secured to each of said springs between said links, a transverse member connecting two of said links and adapted to transmit the longitudinal movement of either of said springs to the other, and means for cushioning such movement of said springs.

In witness whereof I hereunto subscribe my name this 5th day of January, A. D. 1917.

HENRY A. BABCOCK.